(12) United States Patent
Miller et al.

(10) Patent No.: US 7,995,221 B2
(45) Date of Patent: Aug. 9, 2011

(54) METHOD OF PRINTING A MULTI-PAGE DOCUMENT USING A CYCLICAL MULTI-PAGE TRANSPORT APPARATUS

(75) Inventors: Steven Miller, Vancouver, WA (US); David E. De Bellis, Vancouver, WA (US); Daniel L. Stuart, Vancouver, WA (US); William B. Buzbee, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1204 days.

(21) Appl. No.: 11/709,971

(22) Filed: Feb. 22, 2007

(65) Prior Publication Data

US 2008/0204808 A1 Aug. 28, 2008

(51) Int. Cl.
*G06K 15/00* (2006.01)
*B41J 2/01* (2006.01)

(52) U.S. Cl. ............... 358/1.12; 358/1.16; 358/1.17; 347/101; 347/102; 347/104

(58) Field of Classification Search .......... 358/1.12, 358/1.16, 1.17; 347/5, 14, 16, 19, 101, 102, 347/104, 105; 399/82, 83, 85
See application file for complete search history.

(56) References Cited

U.S. PATENT DOCUMENTS

| | | | |
|---|---|---|---|
| 5,504,568 A | 4/1996 | Saraswat et al. | |
| 6,069,704 A * | 5/2000 | Verhaag | 358/1.12 |
| 6,662,717 B2 | 12/2003 | Kubota et al. | |
| 2002/0029703 A1 | 3/2002 | Kubota et al. | |
| 2003/0164971 A1 | 9/2003 | Kidani et al. | |
| 2005/0264591 A1 | 12/2005 | Kato | |
| 2006/0001721 A1 * | 1/2006 | Yraceburu et al. | 347/102 |

FOREIGN PATENT DOCUMENTS

| EP | 0738939 A3 | 9/2000 |
|---|---|---|
| EP | 0738939 B1 | 7/2003 |

* cited by examiner

*Primary Examiner* — Twyler L Haskins
*Assistant Examiner* — Fred Guillermety

(57) ABSTRACT

A method of printing a document having a plurality of pages in an original sequence includes determining an second sequence to print each of the pages, wherein the second equence is different than the original sequence; loading each of the pages onto cyclic multi-page transport apparatus according to the optimal sequence; and unloading the pages from the transport apparatus according to the original sequence.

20 Claims, 5 Drawing Sheets

METHOD OF PRINTING A MULTI-PAGE DOCUMENT USING A CYCLICAL MULTI-PAGE TRANSPORT APPARATUS

BACKGROUND

Drum-based printing systems and other printing systems having cyclic multi-page transport apparatus often offer an effective solution to speed and reliability requirements imposed by mass printing applications. Accordingly, during recent years these printing systems have undergone a trend of continually increasing popularity and demand.

Many printing systems comprise a cyclic multi-page transport apparatus capable of holding several pages in process simultaneously, such as a drum. Completion of a page may take several cycles of the transport apparatus, especially in inkjet and/or color printing systems. The multiple cycles may be due to ink lay-down requirements, drying requirements, or other factors. In such cases, the number of cycles required to print a page may be dependent on a number of factors, including the content of the page. Consequently, the number of cycles of the cyclic multi-page transport apparatus required to print a page in a document may vary from page to page. Thus, pages in the same document may require different lengths of time to print.

Printing systems often have the additional constraint of maintaining a correct page order when a document is printed. That is, the printing system may be limited to unloading the pages of a document from the transport apparatus in a collated order corresponding to the original sequence of pages in the document.

Printing a sequence of pages with varying print methods, while maintaining correct page order output, will result in reduced overall throughput. This is due to pages that take longer to print delaying successive pages that take a shorter amount of time to print. To preserve the page order, pages that are completed in a relatively short time may have to remain on the transport apparatus and cannot be unloaded until a previous page or pages requiring a longer production time on the transport apparatus are completed.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
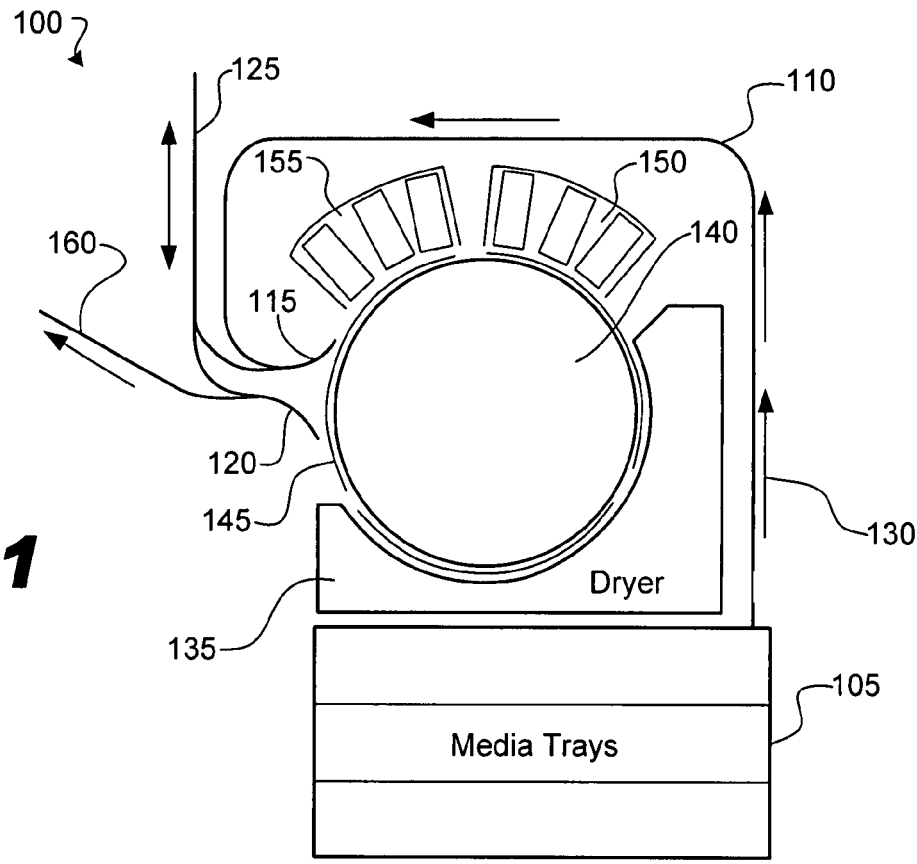
FIG. 1 is a diagram of an exemplary printing apparatus according to principles described herein.

In some cases it may be desirable to maximize printing throughput in a printing system having a cyclic multi-page transport apparatus such as a drum or belt while maintaining an original document page sequence. However, as indicated above, in the case of ink-jet and other printing devices having such transport apparatus, different pages in the document may require varying amounts of time on the transport apparatus to complete the printing process for each individual page. Consequently, loading the pages of a document onto the transport apparatus in the original page sequence may cause some pages that have finished printing to remain on the transport apparatus unnecessarily long to satisfy the constraint that all pages be unloaded from the transport apparatus in the original page sequence. In these situations, printing throughput may be substantially reduced.

To address the issue of improving printer throughput in printing devices having these transport apparatus, the present specification describes exemplary methods and systems for determining an optimal sequence to load pages to be printed onto a cyclic multi-page transport apparatus. This optimal sequence may vary from the sequence in which the pages are to appear in the finished document.

As used in the present specification and in the appended claims, the terms "cyclical multi-page transport apparatus" and its derivatives refer to an apparatus in a printing device to which print media may adhere. Examples of cyclical multi-page transport apparatus thus defined include, but are not limited to, drums, belts, and combinations thereof. Cyclical multi-page transport apparatus, as the term is used herein, may be configured to pass the printing media through different phases of a printing process.

As used in the present specification and in the appended claims, the terms "drum" and "printing drum" refer to a cylindrical cyclical multi-page transport apparatus configured to rotate printing media through different phases of a printing process.

As used in the present specification and in the appended claims, the terms "loading" and "unloading" when used in conjunction with a cyclical multi-page transport apparatus refer to adhering print media to the transport apparatus and removing print media from the transport apparatus, respectively.

As used in the present specification and in the appended claims, the term "original page sequence" refers to the order in which pages are intended to appear in a document as printed or in which the pages appear electronically in the document prior to printing.

As used in the present specification and in the appended claims, the term "optimal page sequence" refers to a sequence or ordering of pages in which those pages are loaded onto a print drum that is deemed preferable to an original page sequence in terms of maximizing the throughput of the printing device. For example, an optimal page sequence thus defined may be considered preferable to an original page sequence because loading the pages of a document to be printed onto the drum according to the optimal page sequence exhibits increased printer throughput, i.e., a reduced amount of time needed to print the document, when compared to the original page sequence. Pages may be loaded to the drum according to the optimal page sequence and then unloaded from the drum according to the original page sequence.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

The principles disclosed herein will now be discussed with respect to exemplary printing systems and exemplary methods of printing multipage documents. While the exemplary printing systems and methods will be discussed primarily in relation to printing devices using printing drums as cyclical multi-page transport apparatus, it should be understood that printing devices using a variety of different cyclical multi-page transport apparatus are contemplated and fall within the scope of the present specification.

Exemplary System

Referring now to FIG. 1, a front view diagram of an exemplary drum-based inkjet printing system (100) is shown. At the center of the system (100) is a rotating cylindrical drum (140). The drum (140) is configured to receive printing media (145) and rotate the media (145) through various phases of the printing process. In this particular embodiment, up to three sheets of media (145) may be loaded in portrait orientation to the drum periphery by means of a partial vacuum created in the interior of the drum (140).

The partial vacuum may hold the printing media (145) to the periphery of the drum (140) throughout printing and drying. Upon completion of the printing and drying processes the printing media (145) may then be unloaded from the drum (140) using "cat scratchers," or small teeth that fit into grooves on the drum (140) and lift the page off of the drum (140).

The drum (140) may be fed printing media (145) through an extended media path (130) in which sheets of printing media (145) stored in media trays (105) are retrieved and transported to the drum (140) where they are deskewed and staged for drum mounting. In some embodiments, two or more different sheets of the printing medium (145) may be mounted on the drum (140) in a single revolution. In other embodiments, only one sheet of printing medium (145) may be mounted on the drum (140) for each revolution of the drum (140)

The sheets of printing media (145) mounted on the drum (140) may be rotated underneath an overhanging array of inkjet print heads (150, 155) for ink application. The inkjet printheads (150, 155) deposit liquid ink droplets on the printing media (145) to create images and/or text on the printing media (145). In some embodiments, the array of inkjet printheads (150, 155) may span the width of printing media (145). In other embodiments the inkjet printheads (150, 155) may scan or move across the face of the media (145) to deposit the ink droplets.

As the drum (140) continues rotating, the sheets of media (145) may pass through a dryer (135). The dryer may use hot air convection to dry the wet media (145). If the sheet of media (145) has finished the printing process, it may then be unloaded from the drum (140). For a one-sided sheet or the second side of a duplex sheet, offloading may be to an output media path (160) and on to either a tray or finisher device. For the first side of a duplex sheet, offloading is to a one-sheet turnaround path (125) that flips the sheet and stages it for remounting to the drum (140). Different sheets of media (145) may remain on the drum (140) for varying amounts of time before being unloaded from the drum (140), depending on the content of the pages to be printed.

One factor affecting the amount of time a sheet of printing media (145) remains on the drum (140) may be desired print quality. In some embodiments, plain paper may undergo two or more rotations beneath the printheads (150, 155) with ink deposition being divided between each of the passes to promote better ink deposition and resulting image quality.

Another factor affecting the amount of time a sheet of printing media (145) remains on the drum (140) is the amount of drying required once ink has been deposited on the sheet of media (145). Depending on ink density and color configuration, a sheet of printing media (145) may require from one to several passes through the dryer (145) to adequately dry the liquid ink to the point that problems such as jamming, ink smearing, cockle, and wetness may be avoided.

An additional factor that may affect the amount of time a sheet of printing media (145) remains on the drum (140) is known as printhead indexing. For some pages in some embodiments, it may be desirable to shift the physical printhead location between passes so that different printhead nozzles address any given page location. In this way nozzle errors are averaged out and printheads (150, 155) may last longer. This shift or "indexing" of the printheads (150, 155) may require an additional rotation, i.e., additional time on the drum (140) to complete printing.

Figure 2:
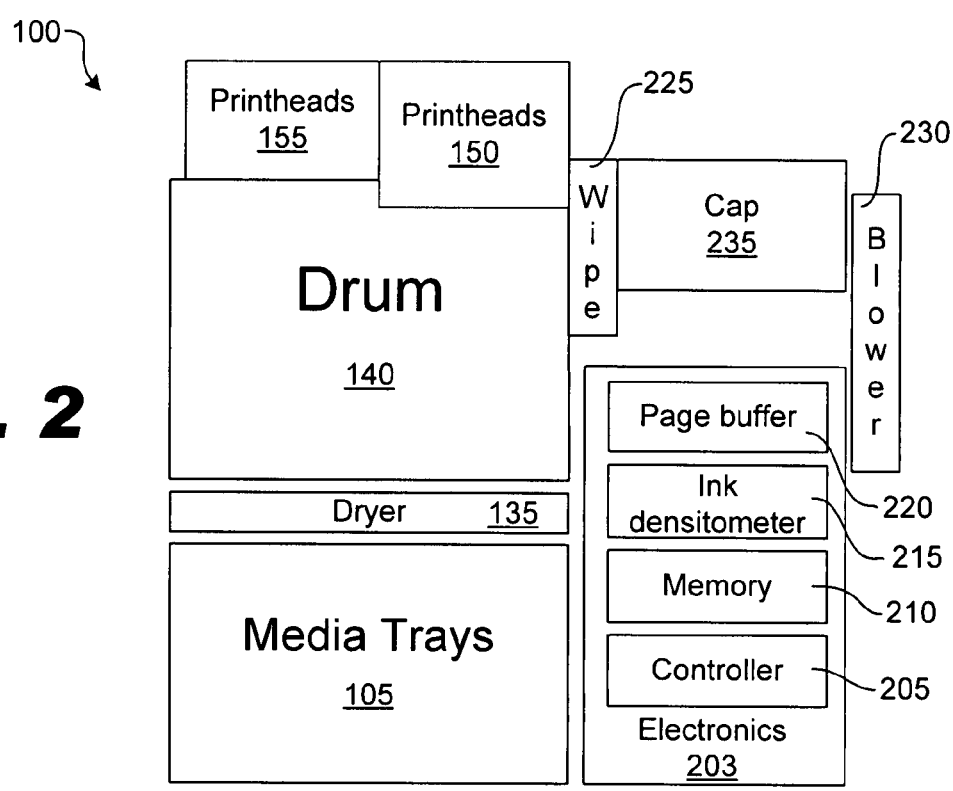
FIG. 2 is a block diagram of an exemplary printing apparatus according to principles described herein.

Referring now to FIG. 2, a side view diagram of the drum-based inkjet printing system (100) of FIG. 1 is shown. As can be seen from the figure, the printing system further comprises a blower (230) for the drum (140) media hold-down and a cap (235) and wipe (225) for service and storage of the printheads (150, 155).

Additionally, the printing system (100) comprises electronics (203) to receive and process document data and convert it into a format used by the printheads (150, 155). The electronics (203) may comprise memory (210) to store document data when it has been received from a computer or other source of input. The data stored in memory (210) may comprise individual page data, the pages having an original sequence. Data corresponding to individual pages may be received into a page buffer (220) that holds the data for a set number of pages. For example, the page buffer (220) may be configured to hold the printhead-ready data of five pages and queue the data of those five pages for printing. When a sheet of printing media (145) is loaded onto the drum (140) to begin printing the next page in the buffer (220) scheduled to be printed, data corresponding to that page used to enable a determination of its print order may be removed from the buffer (220) and data corresponding to another page in the document may be received into the page buffer (220).

Data in the page buffer (220) may be manipulated to rearrange the order in which specific pages in the buffer (220) begin printing. The page data may be received into the page buffer (220) according to an original page sequence of the document and then reordered according to an algorithm to determine an optimal sequence to begin printing each of the pages in the buffer (220). In such embodiments, no more than the set number of pages in the buffer (220) may be out of the original sequence to be printed at any given instance.

As previously discussed, different pages may require varying amounts of time on the drum (140) to complete the printing process. In these cases, it may be advantageous to ascertain an anticipated amount of time each page in the buffer (220) will require to print. This amount of time may be measured by the number of drum rotations needed to print and dry each page. Once an anticipated amount of printing and drying time is determined, the pages in the buffer (220) may be reordered to an optimal sequence determined by an algorithm that maximizes the efficiency of the drum (140) and allows the pages to unload from the drum (140) according to the original sequence of the pages.

The anticipated amount of printing and drying time required for individual pages in the buffer may be determined electronically before loading the pages onto the drum (140) using an ink densitometer (215). The ink densitometer (215) may be implemented in software or hardware and may be part of controller circuitry (205) or an independent circuitry block. The ink densitometer (215) may analyze the digital data corresponding to page data in the buffer and determine how many passes through the dryer (135) and past the printheads a page will require to complete the printing operation.

Controller circuitry (205) may comprise application specific integrated circuits (ASICs), microcontrollers, or other processing elements. Examples of functions that may be performed by controller circuitry (205) include, but are not limited to, processing and converting data as it is received into memory (210) of the printing system (100), maintaining the page buffer (220), determining an amount of time on the drum (140) required by each page in the buffer (220) to print, determining an optimal page order for the buffer (220), controlling printhead (150, 155) operation, controlling drum rotation, controlling dryer and media tray operation, performing user interface operations, and other functions.

Exemplary Methods

Figure 3:
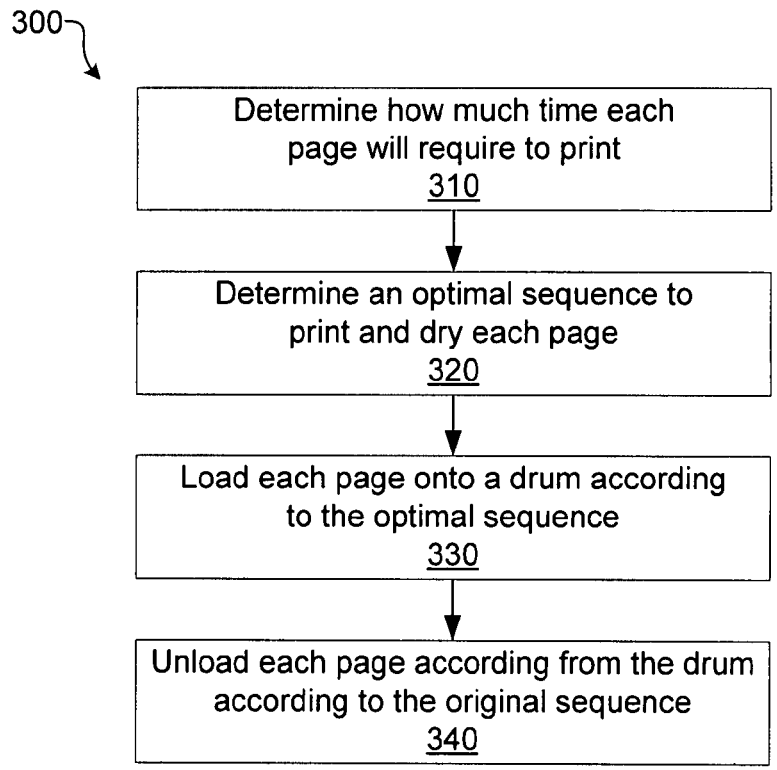
FIG. 3 is a flowchart illustrating an exemplary method of printing a document having a plurality of pages, according to principles described herein.

Referring now to FIG. 3, a flowchart illustrating an exemplary method (300) of printing a document having a plurality of pages in an original sequence is shown.

In the method (300), it is first determined (step 310) how much time each page in the document will require to print. The amount of time required by each page to print may be measured as a number of drum rotations needed to print and dry the page. Examples of factors upon which the step of determining (step 320) the optimal sequence may be based include usage efficiency of a printing drum, the number of printing passes required for each page, the number of drying passes required for each page, the amount of drum space required to index one or more printhead arrays, and combinations thereof.

Once the amount of time has been determined (310) for each page, an optimal sequence to print and dry each page is determined (step 320). The optimal sequence may be different from the original page sequence of the document.

In the optimal sequence, pages requiring longer print times may be loaded to the drum before pages requiring a shorter print time, irrespective of the original page sequence. In this way, the page requiring longer time for completion is on the drum first and can be printed while previous, less time intensive, pages load, print, and unload on the other available facets before the more time intensive page completes. This allows the sequence of pages up to and including the more time intensive page to complete sooner enabling the entire sequence to complete more quickly. After determining (step 320) the optimal sequence to print and dry each page, the pages are loaded (step 330) onto the printing drum according to the optimal sequence. Each page may only be loaded onto the drum when space is available to receive the page on the drum.

When pages are printed and dried, the pages are unloaded (step 340) from the drum according to the original page sequence. Thus the optimal sequence alters the sequence in which pages are loaded onto the drum, but the pages are unloaded from the drum according to the sequence in which they were intended to finish printing.

Figure 4:
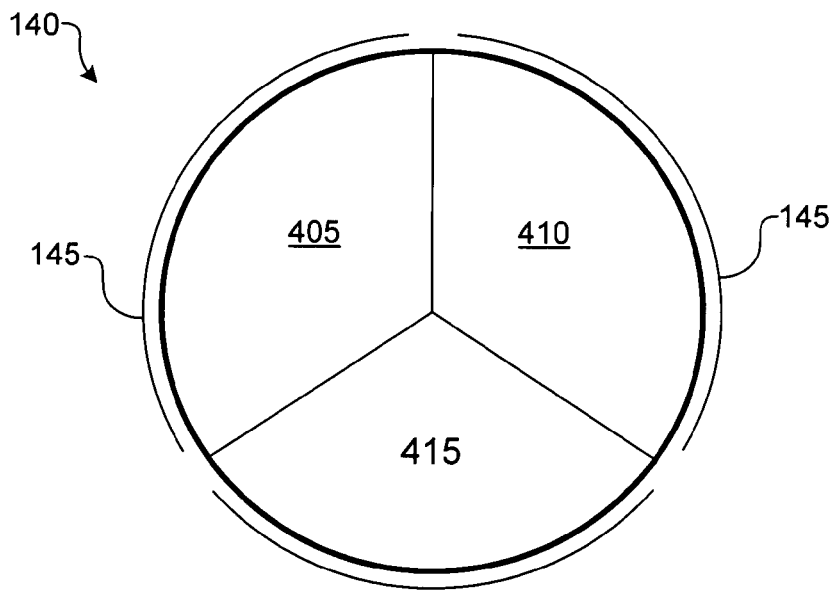
FIG. 4 is a diagram of an exemplary printing drum, according to principles described herein.

Referring now to FIG. 4, an exemplary embodiment of a printing drum (140) is shown. The periphery of the drum is divided into three facets (405, 410, 415) upon which printing media (145) may be loaded. In other embodiments, printing drums may comprise more or fewer facets depending on the size of the drums and printing media.

As the printing drum (140) of this embodiment has three facets (405, 410, 415), a maximum of three sheets of printing media (145) may be loaded on the drum (140) and may be undergoing the printing/drying process at any given time. Therefore, determining an optimal printing and drying sequence (step 320) may include allocating time on the drum for each of the pages, scheduling each facet according to the amount of time required by the pages to print and dry.

Figure 5:
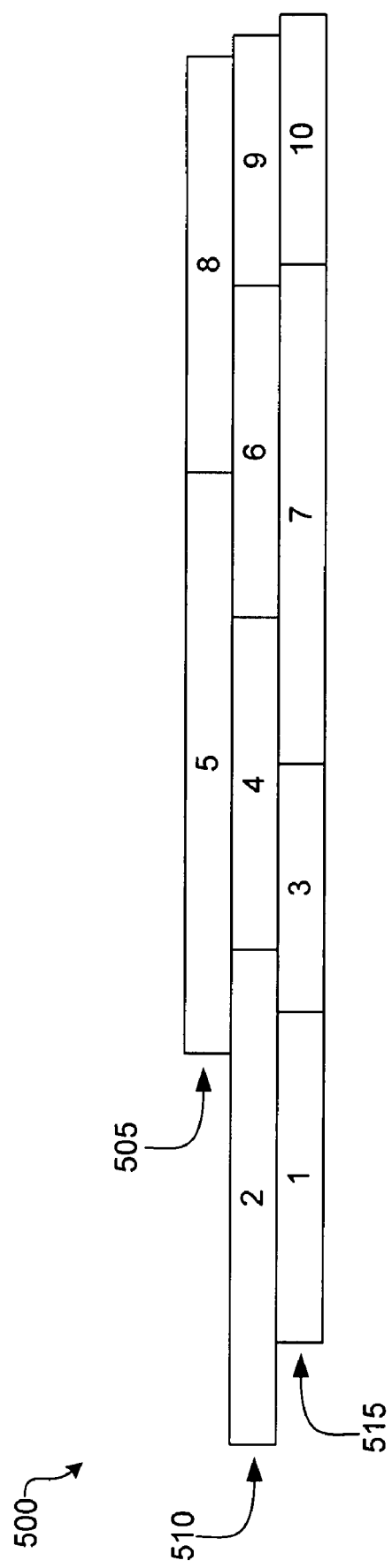
FIG. 5 is a diagram of an exemplary printing schedule, according to principles described herein.

Referring now to FIG. 5, one such exemplary schedule (500) is represented. In the exemplary schedule (500), ten pages are represented by boxes with numerals 1 through 10. The pages are numbered in accordance with the original page sequence of the document. In FIG. 5, the amount of time each page requires to print is represented by the horizontal length of the boxes.

In the example of FIG. 5, the pages are scheduled for printing on three facets (505, 510, 515) of a printing drum. As can be seen by the schedule in the example of FIG. 5, the pages are loaded onto the drum in an optimal page sequence that is different from the original page sequence. In the example of FIG. 5, the optimal page sequence is 2-1-5-3-4-7-6-8-9-10. However, the pages are unloaded from the drum in the consecutive order of the original page sequence (i.e., 1-2-3-4-5-6-7-8-9-10).

The optimal sequence used in this example provides maximum printing throughput while maintaining the original sequence in unloading pages from the drum.

As explained herein, a variety of algorithms may be used to determine the optimal printing sequence, depending on many variables. The optimal printing sequence shown on the schedule (500) represents the result of a back-to-front algorithm where time is allocated on the drum for each of the pages beginning with a page scheduled to print last and ending with a page scheduled to print first, according to the original sequence. In other embodiments, front-to-back or other algorithms may be used to determine the optimal sequence.

Figure 6:
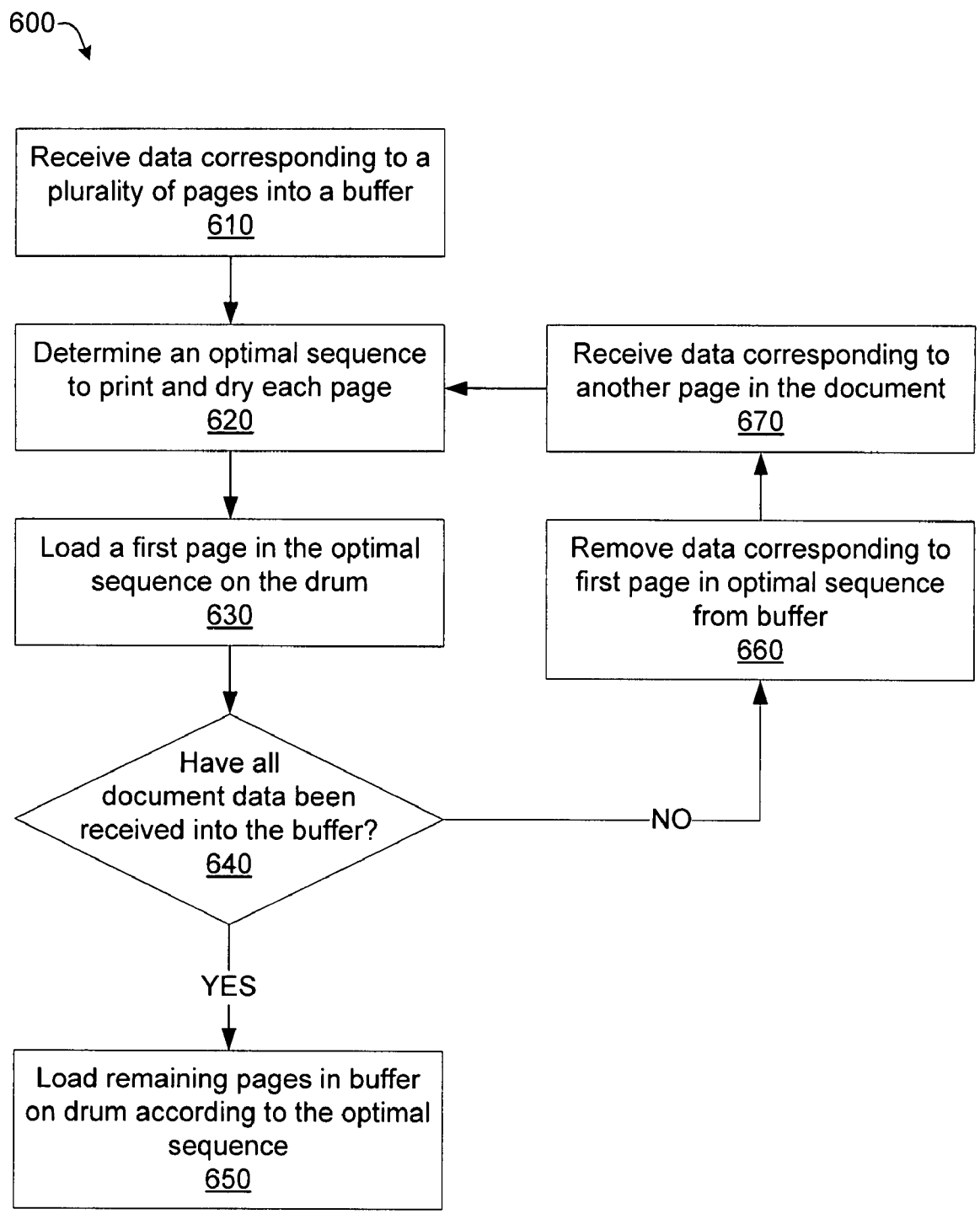
FIG. 6 is a flowchart illustrating an exemplary method of printing a document having a plurality of pages, according to principles described herein.

Referring now to FIG. 6, a flowchart representing another exemplary method (600) of printing a document having a plurality of pages is shown. In the illustrated method (600), data corresponding to a plurality of pages is received (step 610) into a buffer. The buffer may be implemented using electronic memory and store printhead-ready data for a set number of pages in queue to be printed, as described above. A typical buffer may contain data for five upcoming pages, but any of a variety of sizes of buffers may be used. The page data may be received into the buffer according to an original document sequence.

Once the buffer has been filled with the data received (step 610), an optimal sequence is determined (step 620) to print and dry each of the pages in the buffer using anticipated printing and dry times for each of the pages. The printing and dry times for the pages may be determined by digitally analyzing the data corresponding to the pages in the buffer. This analysis may occur before or after the page data is formatted for printheads and transferred into the buffer. The constraint of unloading the pages according to the original document sequence may also be used in determining (step 620) the optimal sequence.

The first page according to the optimal sequence is then loaded (step 630) on the drum at the next available opportunity. After the first page in the optimal sequence is loaded (step 630) on the drum, it is ascertained (step 640) whether all of the document page data have been received into the buffer. If no page data from the document remain to be moved into the buffer, the remaining pages are then loaded (step 650) onto the drum according to the already determined optimal sequence (step 630).

In the event that all document data are determined to have not been received into the buffer, data corresponding to the now loaded first page in the buffer are removed (step 660) and data corresponding to another page in the document (step 670) are received into the buffer. With the new page data received (step 670) and the old page data removed (step 660), a new optimal sequence is determined (step 620) to print and dry each of the pages in the buffer and the first page of the new optimal sequence (step 630) is loaded onto the drum. The new optimal sequence may take into account pages that are already printing or drying on the drum. The method (600) proceeds according in the manner described above until all pages of the document to be printed have been loaded onto the drum.

Figure 7:
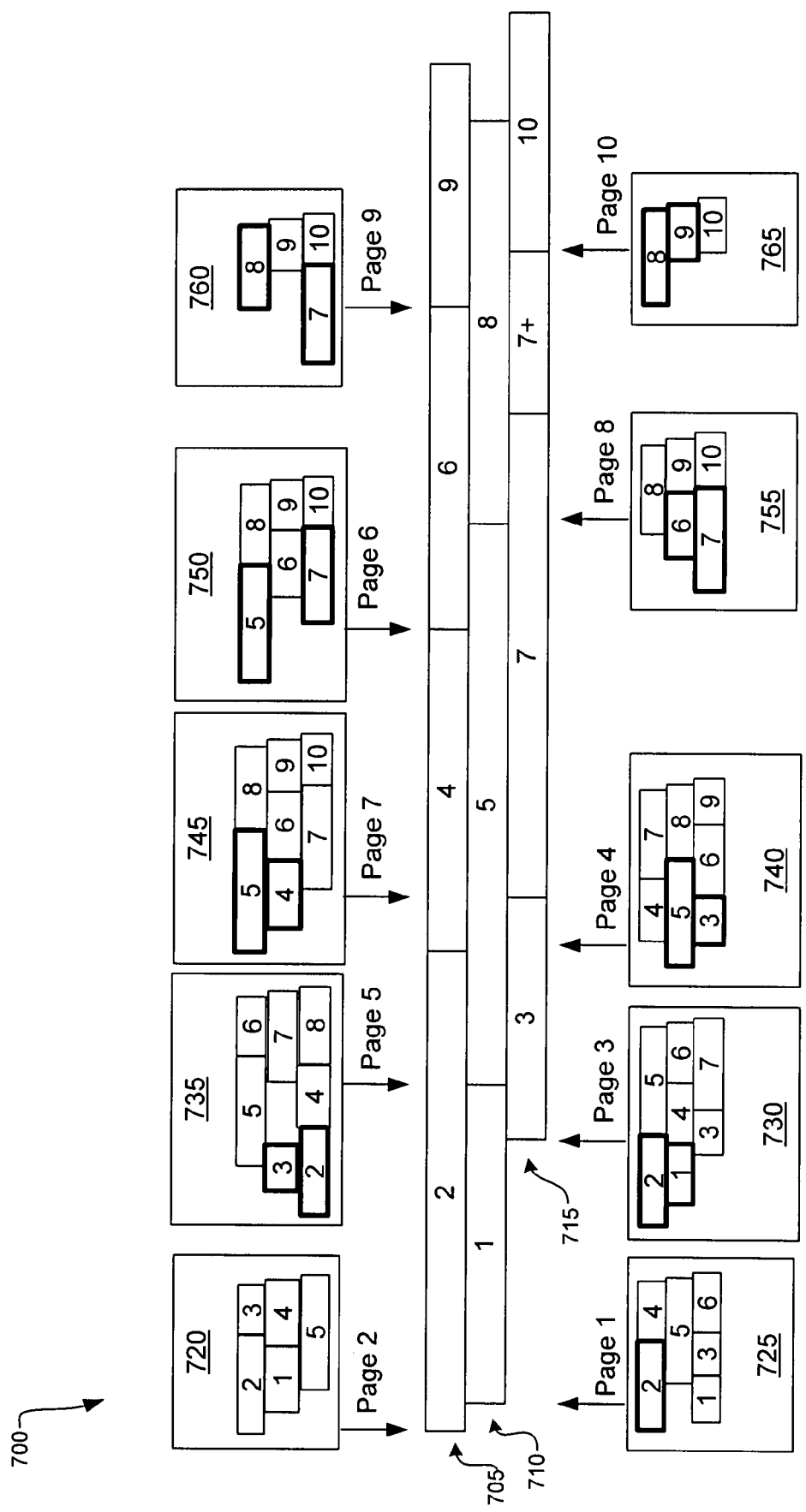
FIG. 7 is a diagram of an exemplary printing schedule, according to principles described herein.

Referring now to FIG. 7, an exemplary printing schedule (700) according to the previously described method (600, FIG. 6) is shown. In the exemplary schedule (700), ten pages are represented by boxes with numerals 1 through 10 indicative of the original page order of the document. The pages are scheduled on three facets (705, 710, 715) of a drum. The amount of time each page requires to print is represented by the horizontal length of the boxes. As can be seen by the schedule, the pages are loaded onto the drum in the order 2-1-3-5-4-7-6-8-9-10. However, the pages are unloaded from the drum in the consecutive order of the original sequence (i.e., 1-2-3-4-5-6-7-8-9-10).

For each page, a vector may be constructed of required resources such as number of print spins, whether it needs to be flipped in the duplex unit, and number of drying spins, among others. Pages may then be scheduled by shifting the competing resource requests until no conflicts exist. Starting with the last page to complete, the algorithm works backwards in time shifting pages into the schedule until all of the pages in the buffer are scheduled. The page with the earliest start time is the first page in the optimal sequence.

Representations (720, 725, 730, 735, 740, 745, 750, 755, 760, 765) of the optimal sequence determined for the page data in the buffer are shown at each instant a new page is loaded onto the drum. The darker boxes show pages existing on the drum at the time the new optimal sequence is generated. Due to the limited look-ahead capabilities of the buffer, page 7 completes early in this example and thus has to wait until page 6 completes to preserve the original sequence in unloading the pages from the drum. However, drum usage efficiency is significantly increased over loading the pages onto the drum according to the original document sequence.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A method of printing a document having a plurality of pages in an original sequence, said method comprising:
   determining a second sequence to print each of said pages, wherein said second sequence is different than said original sequence;
   loading each of said pages onto a cyclical portion of a cyclic multi-page transport apparatus according to said second sequence; and
   unloading said pages from said transport apparatus according to said original sequence.

2. The method of 1, wherein said second sequence is determined based on at least one factor selected from the group of: a number of printing passes required for each page, a number of drying passes required for each page, an amount of transport apparatus area required to index one or more printhead arrays, and combinations thereof.

3. The method of 1, wherein said determining said second sequence to begin printing each of said pages is based on a total length of time for each of said pages to print.

4. The method of 3, wherein pages having longer print times are placed before pages having shorter print times in said second sequence.

5. The method of 3, wherein said length of time is forecast by determining an anticipated number of total cycles of said multi-page transport apparatus used to print each of said pages.

6. The method of 3, wherein said step of determining a second sequence further comprises allocating time on said transport apparatus for said length of time for each of said pages, beginning with a page scheduled to print last and ending with a page scheduled to print first, according to said original sequence.

7. A method of printing a document including a plurality of pages, said method comprising:
   in a buffer, receiving data corresponding to the plurality of pages in an original sequence, each of said pages having a corresponding number of anticipated cycles of a multi-page transport apparatus for printing said page, wherein said cyclic multi-page transport apparatus has a cyclical portion;
   determining a second sequence in which to print said pages in said buffer, said second sequence being determined in response to said number of anticipated cycle of said multi-page transport apparatus for printing each page; and
   loading pages in said second sequence onto said cyclical portion of said multi-page transport apparatus.

8. The method of 7, further comprising the step of removing data corresponding to a first page from said buffer upon printing said first page and receiving in said buffer data corresponding to an additional page of said document to be printed.

9. The method of 8, further comprising printing subsequent pages according to said second sequence, page data being removed from and added to said buffer, until data corresponding to all pages of said document have been received into said buffer.

10. The method of 7, unloading said pages from said multi-page transport apparatus according to said original sequence.

11. The method of 10, wherein said second sequence is additionally based on being able to unload said pages from said multi-page transport apparatus according to said original sequence.

12. The method of 7, wherein said determining said second sequence further comprises determining current multi-page transport apparatus usage by pages already being printed or dried.

13. The method of 7, wherein said step of determining a second sequence further comprises allocating time on said multi-page transport apparatus for said length of time for each of said pages, beginning with a page scheduled to print last and ending with a page scheduled to print first, according to said original sequence.

14. A system for printing a document having a plurality of pages in an original sequence, said system comprising:
   a printing device;

a cyclic multi-page transport apparatus having a cyclical portion, in said printing device, configured to hold printing media on a moving surface of said cyclical portion as pages of said document are printed on said media; and a controller in said printing device for determining a second sequence, different from said original sequence, in which to print each of said pages in said document to maximize usage efficiency of said cyclic multi-page transport apparatus and maintaining a desired page output sequence;

wherein said printing device prints pages of said document on said printing media in said second sequence and unloads pages from said cyclic multi-page transport apparatus in said original sequence; and further comprising means for loading each of said pages onto said cyclical portion of said cyclic multi-page transport apparatus.

15. The system of 14, wherein said cyclic multi-page transport apparatus is configured to rotate said printing media through different printing phases in said printing device.

16. The system of 15, wherein said printing phases comprise media loading phases, unloading phases, ink or toner deposition phases, drying phases, and combinations thereof.

17. The system of 14, wherein said printing device comprises means for storing an electronic buffer of data corresponding to said pages.

18. The system of 17, further comprising means for determining an anticipated number of cycles of said cyclic multi-page transport apparatus required to print each of said pages.

19. The system of 18, wherein factors determining said anticipated number of cycles of said cyclic multi-page transport apparatus are selected from the group consisting of: amount of ink to be printed on said page, characteristics of high ink density objects, type of ink(s), characteristics of printing media, temperature, humidity, available power from printing device, dryer temperature, dryer humidity, performance requirements, and combinations thereof.

20. The system of claim 14, wherein the plurality of pages are a subset of the total number of pages in the document.

* * * * *

UNITED STATES PATENT AND TRADEMARK OFFICE
CERTIFICATE OF CORRECTION

| | | |
|---|---|---|
| PATENT NO. | : 7,995,221 B2 | Page 1 of 1 |
| APPLICATION NO. | : 11/709971 | |
| DATED | : August 9, 2011 | |
| INVENTOR(S) | : Steven Miller et al. | |

It is certified that error appears in the above-identified patent and that said Letters Patent is hereby corrected as shown below:

In column 8, line 1, in Claim 2, delete "1," and insert -- claim 1,--, therefor.

In column 8, line 7, in Claim 3, delete "1," and insert -- claim 1, --, therefor.

In column 8, line 10, in Claim 4, delete "3," and insert -- claim 3,--, therefor.

In column 8, line 14, in Claim 5, delete "3," and insert -- claim 3, --, therefor.

In column 8, line 18, in Claim 6, delete "3," and insert -- claim 3, --, therefor, in column 8, line 39, in Claim 8, delete "7," and insert -- claim 7, --, therefor.

In column 8, line 44, in Claim 9, delete "8," and insert -- claim 8, --, therefor.

In column 8, line 49, in Chum 10, delete "7," and insert -- claim 7, --, therefor.

In column 8, line 51, in Claim 11, delete "10," and insert -- claim 10, --, therefor.

In column 8, line 55, in Claim 12, delete "7," and insert -- claim 7, --, therefor.

In column 8, line 59, in Claim 13, delete "7," and insert -- claim 7, --, therefor.

In column 9, line 19, in Claim 15, delete "14," and insert -- claim 14, --, therefor.

In column 10, line 1, in Claim 16, delete "15," and insert -- claim 15, --, therefor.

In column 10, line 4, in Claim 17, delete "14," and insert -- claim 14, --, therefor.

In column 10, line 7, in Claim 18, delete "17," and insert -- claim 17, --, therefor.

In column 10, line 10, in Claim 19, delete "18," and insert. -- claim 18, --, therefor.

Signed and Sealed this
Twenty-eighth Day of February, 2012

David J. Kappos
*Director of the United States Patent and Trademark Office*